United States Patent
Craane et al.

(10) Patent No.: US 12,031,369 B2
(45) Date of Patent: Jul. 9, 2024

(54) OPEN ROOF ASSEMBLY FOR USE IN A VEHICLE AND A METHOD FOR OPERATING SAME

(71) Applicant: Inalfa Roof Systems Group B.V., Oostrum (NL)

(72) Inventors: Dennie Wilhelmus Hendrikus Craane, Nijmegen (NL); Marco van Mourik, Ravenstein (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 36 days.

(21) Appl. No.: 17/177,828

(22) Filed: Feb. 17, 2021

(65) Prior Publication Data
US 2021/0254386 A1    Aug. 19, 2021

(30) Foreign Application Priority Data

Feb. 19, 2020 (EP) ...................................... 20158311

(51) Int. Cl.
| | | |
|---|---|---|
| *E05F 15/00* | (2015.01) | |
| *B60J 7/04* | (2006.01) | |
| *E05F 15/44* | (2015.01) | |
| *E05F 15/643* | (2015.01) | |

(52) U.S. Cl.
CPC ............... *E05F 15/443* (2015.01); *B60J 7/04* (2013.01); *E05F 15/643* (2015.01); *E05Y 2201/434* (2013.01); *E05Y 2201/654* (2013.01); *E05Y 2400/54* (2013.01); *E05Y 2900/542* (2013.01)

(58) Field of Classification Search
CPC ............ E05F 15/443; E05F 15/44; B60J 7/04
See application file for complete search history.

(56) References Cited

U.S. PATENT DOCUMENTS

| | | | | |
|---|---|---|---|---|
| 5,051,672 A | * | 9/1991 | Yaguchi | ............... H02H 7/0851 |
| | | | | 318/434 |
| 2019/0003231 A1 | * | 1/2019 | Kigoshi | ................ E05F 15/695 |

FOREIGN PATENT DOCUMENTS

| | | | | |
|---|---|---|---|---|
| CN | 108979415 A | * | 12/2018 | ............ E05F 15/443 |
| CN | 108979415 A | | 12/2018 | |
| GB | 2268644 A | | 1/1994 | |

OTHER PUBLICATIONS

European Search Report for corresponding European Patent Application No. 20158311.9, dated Sep. 2, 2020.

* cited by examiner

*Primary Examiner* — Daniel J Troy
*Assistant Examiner* — Daniel Alvarez
(74) *Attorney, Agent, or Firm* — Steven M. Koehler; Westman, Champlin & Koehler, P.A.

(57) ABSTRACT

An open roof assembly for use in a vehicle roof of a vehicle comprises a movably arranged closure member for closing an opening in the vehicle roof and a pinch detection module for detecting a pinch of an object between the closure member and an edge of the opening. The pinch detection module is operatively coupled to receive an input signal and is configured to detect the pinch based on said input signal and a threshold. The pinch detection module is configured to dynamically determine the threshold based on the input signal.

18 Claims, 8 Drawing Sheets

OPEN ROOF ASSEMBLY FOR USE IN A VEHICLE AND A METHOD FOR OPERATING SAME

BACKGROUND

The discussion below is merely provided for general background information and is not intended to be used as an aid in determining the scope of the claimed subject matter.

The invention relates to an open roof assembly for use in a vehicle roof of a vehicle.

An open roof assembly for use in a vehicle roof of a vehicle is known. In particular, a known open roof assembly comprises a movably arranged closure member for closing an opening in the vehicle roof. For example, the closure member may be a glass panel that may be tilted or slid open. Thus, in a closed position, daylight may enter an interior of the vehicle through the glass panel in the roof, while in a tilted or at least partially slid open position, an air flow between the interior and an exterior is enabled.

In the known open roof assembly, a pinch detection module is provided. The pinch detection module is configured for detecting a pinch of an object between the closure member and an edge of the opening in the vehicle roof. Such a pinch detection module may be provided for safety reasons or to protect the open roof assembly against damage.

In particular for safety reasons, legal requirements may be applicable. Although such legal requirements may vary depending on the jurisdiction, commonly there is a maximum pinch force of 100 N applicable. So, the pinch detection module is preferably designed and configured to detect a pinch and stop a movement of the closure member before an object is pinched with a force exceeding 100 N. While the maximum force of 100 N is a common requirement, how to determine the maximum force, e.g. the kind of object used, may differ significantly. For example, in some jurisdictions, a hard object is to be used, while in other jurisdictions, a soft object is to be used for determining whether the legal requirements are satisfied.

The pinch detection module is operatively coupled to receive an input signal and is configured to detect the pinch based on said input signal and a threshold. For example, the input signal may have an increased amplitude, when a pinch occurs. Then, if the amplitude exceeds the threshold, a pinch is detected. In another known embodiment, a rate of increase or decrease of the input signal over time may be compared to the threshold such that when the signal increases faster than the threshold, a pinch is detected.

The above-indicated known methods to detect the occurrence of a pinch are able to detect a pinch, but are also sensitive to deviating circumstances due to which the pinch detection module may falsely detect the occurrence of a pinch when actually no pinch has occurred. Therefore, in practice, either the threshold is set relatively low to ensure that each pinch is detected, resulting in the pinch detection module falsely detecting the occurrence of a pinch regularly, or the threshold is set relatively high to prevent such false detections, but resulting in an increased possibility that an actual pinch is not detected, which may impose a safety risk. Usually, a trade-off between both thresholds is selected such that with sufficient safety a minimum of false pinch detections occur.

However, due to manufacturing tolerances, local legal requirements and varying operating conditions e.g. due to weather, road conditions, wear over time, and the like, a suitable threshold may be difficult to set and may require additional manufacturing operations to set a dedicated threshold per open roof assembly, which dedicated threshold may need to be adapted over time due to wear.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

As will be appreciated by one skilled in the art, aspects of the present invention may be embodied as a system, method or computer program product. Accordingly, aspects of the present invention may take the form of an entirely hardware embodiment (analog and/or digital components), an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, an optical storage device, a magnetic storage device, or any suitable combination of the foregoing. In the context of this document, a computer readable storage medium may be any tangible medium that can comprise, or store a program for use by or in connection with an instruction execution system, apparatus, or device.

Computer program code for carrying out operations for aspects of the present invention may be written in any combination of one or more programming languages, including a functional or an object oriented programming language such as Java™, Scala, C++, Python or the like and conventional procedural programming languages, such as the "C" programming language or similar programming languages.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by analog or digital components, or computer program instructions. These computer program instructions may be provided to a processor, in particular a microprocessor or central processing unit (CPU), a special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

An aspect of the present invention is to provide for a safe and reliable pinch detection system and method that is able to adapt to varying circumstances.

In a first aspect, the object is achieved in an open roof assembly for use in a vehicle roof of a vehicle. The open roof assembly comprises a movably arranged closure member for closing an opening in the vehicle roof and a pinch detection module for detecting a pinch of an object between the closure member and an edge of the opening. The pinch detection module is operatively coupled to receive an input signal. Further, the pinch detection module is configured to detect the pinch based on said input signal and a threshold. The pinch detection module is further configured to dynamically determine the threshold based on the input signal.

The threshold is dynamically adapted based on the input signal thereby making the threshold adaptive to the actual circumstances. Depending on the input signal and in particular how the input signal develops over time, the threshold is adapted. If the input signal increases over time, the threshold may increase with the input signal or may decrease, which depends on the circumstances. In case of a rapid change in the input signal, the threshold may change a little before the input signal exceeds the threshold and a pinch is detected, while with a slowly changing input signal, the threshold may slowly decrease and ultimately the input signal may exceed the threshold such that a pinch is detected. Moreover, not only is the pinch detection module able to compensate for changes due to circumstances, the pinch detection module is thus also well adapted to detect a pinch with either a soft or a hard object.

In an embodiment of the open roof assembly, the pinch detection module is configured to perform the steps of receiving the input signal; determining the threshold based on the input signal; detecting the pinch by comparing the input signal to the threshold as determined in step b; and repeating the preceding steps. In this embodiment, the threshold is repeatedly determined based on the input signal. After having determined the threshold, the threshold and the input signal are compared in order to determine whether a pinch occurred. If the comparison has not indicated the occurrence of a pinch, the steps are repeated.

It is noted that depending on e.g. desired accuracy and temporal sensitivity, the step of determining the threshold may not be executed in every cycle of the steps. For example, if the input signal comprises samples at a high sampling rate, it may suffice to determine the threshold at a lower rate, e.g. once per 10 samples of the input signal. While this may suffice for the pinch detection, it lowers the requirements on the resources and thus increases cost-effectiveness.

In an embodiment of the open roof assembly, the pinch detection module is configured to normalize the input signal prior to determining the threshold, thereby providing a normalized input signal. As used herein, the normalization is intended to remove an input offset from the input signal in order to enable a pinch detection based on deviations and variations in the input signal. These deviations and variations remain in the normalized input signal.

In a particular embodiment, a median value of a selected part of the input signal is derived and the median value is subtracted from the input signal to provide the normalized input signal. Thus, the median value of a part of the input signal is considered to be representative for the input offset.

In a further embodiment, a rate of change of the normalized input signal over time is limited by the pinch detection module. Assuming that acceptable variations in the input offset are slow changes, the rate of change of the input offset is limited such that a more rapid change remains reflected in the normalized input signal as a possible indicator of a pinch.

In an embodiment, the step of determining the threshold comprises determining an input compensation value based on the input signal and combining a threshold bias value and the input compensation value. In a particular embodiment, the step of determining the input compensation value comprises determining a median value of one of the input signal and a normalized input signal. The threshold bias value is adapted based on the input signal by determining the input compensation value from the input signal. Determining the input compensation value may comprise determining the median of the input signal, wherein a rate of change over time may be limited by the pinch detection module, similar to the above-described embodiment for determining the normalized input signal.

In an embodiment, the step of determining the threshold comprises deriving an input saturation value from the input signal and combining a threshold bias value and the input saturation value. Specific properties and characteristics of the input signal, e.g. due to properties and characteristics of a sensor supplying the input signal such as a possible saturation of the sensor, may be taken into account using the saturation value, wherein the saturation value is selected from a table or determined based on the input signal.

In an embodiment, a rate of change of the threshold over time is limited by the pinch detection module. Similar to the above-described embodiment of the normalized input signal, a steep change of the threshold based on a change of the input signal is not expected and is therefore presumed to be an indicator of a pinch. Therefore, the rate of change may be limited to prevent that a pinch may not be detected as a result of the threshold having been overly adapted.

In a particular embodiment, the open roof assembly is provided with a pressure sensing device configured to output a sensing signal, wherein the pressure sensing device is arranged and configured to change the sensing signal when an object is pinched, and wherein the input signal as provided to the pinch detection module corresponds to the sensing signal. A number of kinds of pressure sensing devices for detecting a pinch in an open roof assembly are known in the art. For example, an elongate sensor with a pressure dependent electrical resistance is known, wherein a voltage is applied over terminals of the sensor and when pressure is applied on the sensor on any position the electrical resistance is lowered. An electrical current change may be used as a sensor signal or, using further circuitry, a voltage may be used as a sensor signal. Such a sensor signal may be used as the input signal for the pinch detection module according to the present invention.

In a further aspect, the present invention provides a method for operating an open roof assembly for use in a vehicle roof of a vehicle, wherein the open roof assembly comprises a movably arranged closure member for closing an opening in the vehicle roof and a pinch detection module for detecting a pinch of an object between the closure member and an edge of the opening. The pinch detection module is operatively coupled to receive an input signal and is configured to detect the pinch based on said input signal and a threshold. The method comprises dynamically determining the threshold based on the input signal.

In an embodiment, the method comprises the steps of receiving the input signal; determining the threshold based on the input signal; detecting the pinch by comparing the input signal to the threshold as determined; and repeating the preceding steps.

In a further embodiment, the step of determining the threshold comprises the steps of normalizing the input signal to obtain a normalized input signal; limiting a rate of change of the normalized input signal over time; determining an input compensation value, based on the normalized input signal;

b4) providing a threshold bias value; determining an input saturation value based on the input signal; and combining the input compensation value, the input saturation value and the threshold bias value to obtain the threshold.

In a further aspect, the present invention provides a computer software product comprising computer readable and executable instructions for instructing a computer processor to perform the method steps according to the above-described aspect of the present invention.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art.

DETAILED DESCRIPTION OF THE ILLUSTRATIVE EMBODIMENTS

The present invention will now be described with reference to the accompanying drawings, wherein the same reference numerals have been used to identify the same or similar elements throughout the several views.

Figure 1A:
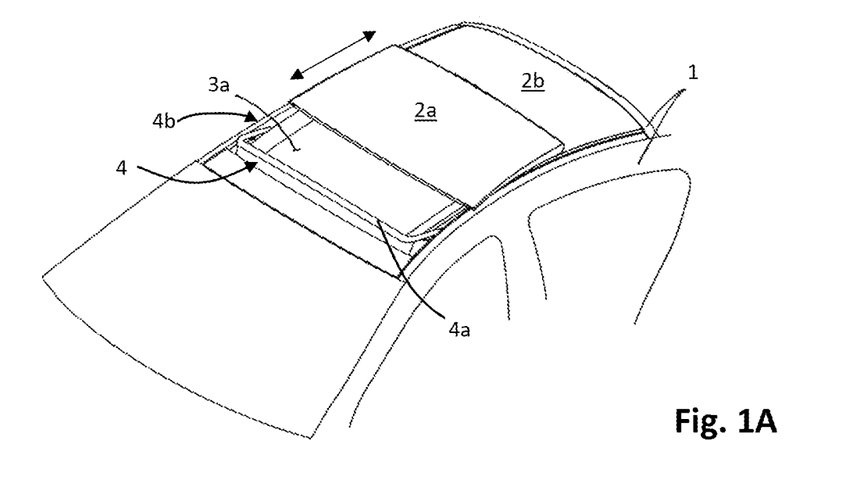
FIG. 1A shows a perspective view of a vehicle roof with an open roof assembly.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end (RE) of the moveable panel 2a is raised as compared to the closed position, while a front end (FE) of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
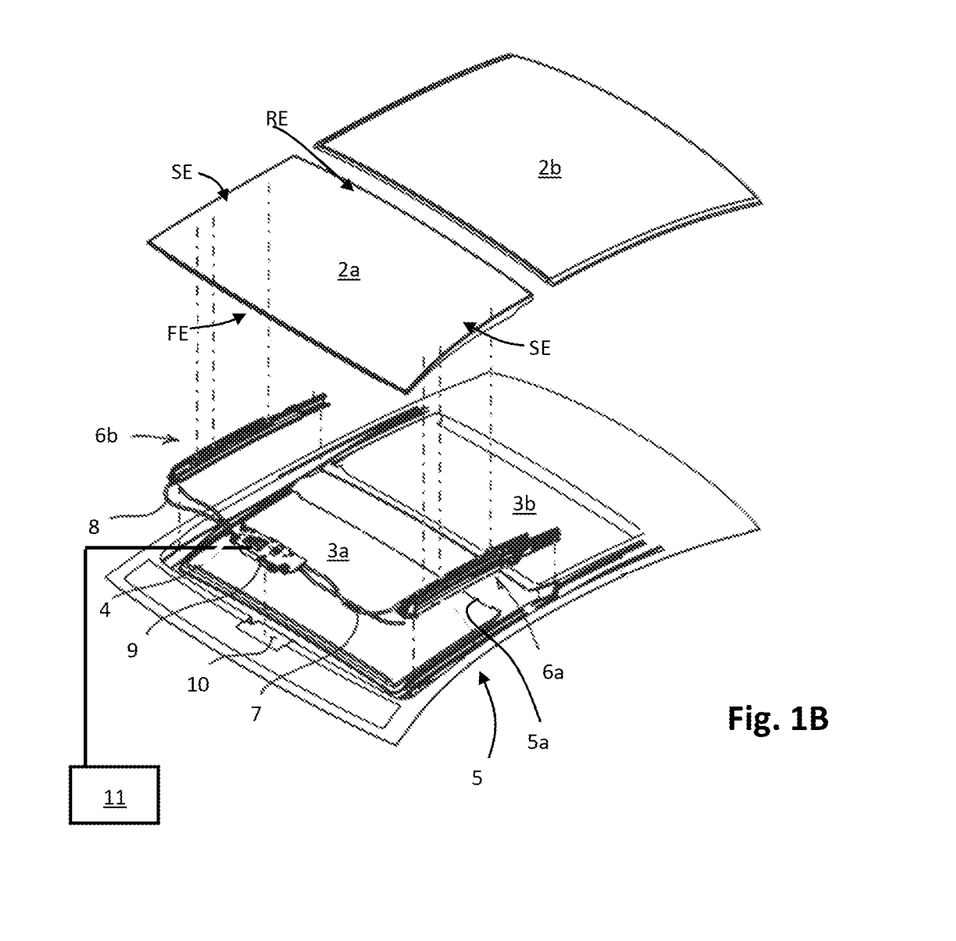
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end (FE) of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end (RE) of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end (RE) and then sliding the moveable panel 2a under the fixed panel 2b or any other structure or element provided behind the rear end (RE) of the moveable panel 2a. In further exemplary embodiments, the moveable panel 2a may be merely moveable between a closed position and a tilted position or between a closed position and an open position.

In the illustrated embodiment, the electric motor 9 is mounted near or below the front end (FE) of the moveable panel 2a at a recess 10. In another embodiment, the electric motor 9 may be positioned at any other suitable position or location. For example, the electric motor 9 may be arranged near or below the rear end (RE) of the moveable panel 2a or below the fixed panel 2b.

A control unit 11 is schematically illustrated and is operatively coupled to the electric motor 9. The control unit 11 may be any kind of processing unit, either a software controlled processing unit or a dedicated processing unit, like an ASIC, which are both well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the electric motor 9 and thus the moveable roof assembly.

Figures 2A, 2B, 2C:
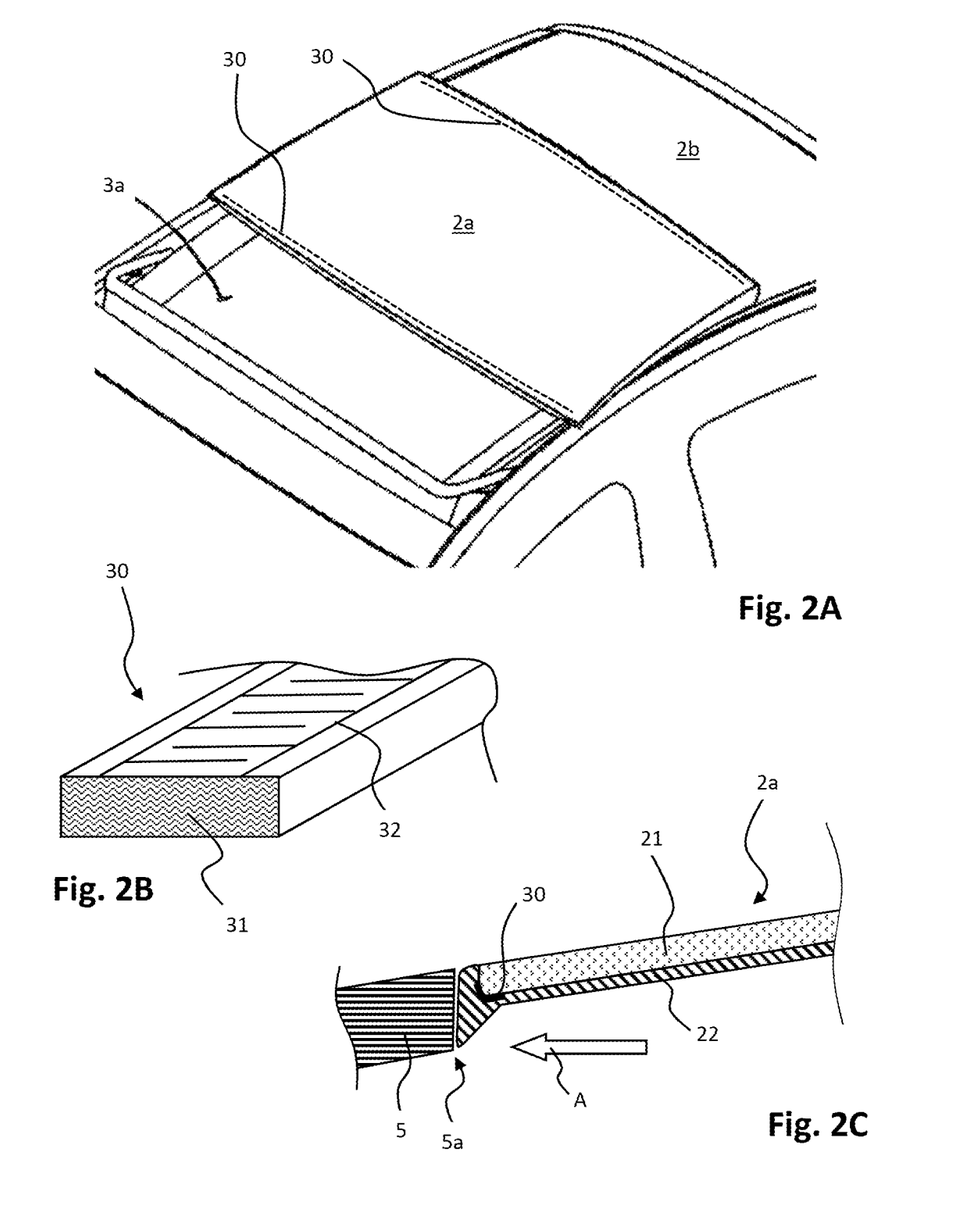
FIG. 2A shows a perspective view of an embodiment of an open roof assembly.
FIG. 2B shows a cross-sectional perspective view of a pressure sensitive device for use in the embodiment of FIG. 2A.
FIG. 2C shows a cross-sectional view of a part of the embodiment of FIG. 2A.

FIG. 2A shows an enlarged part of the perspective view of FIG. 1A as an embodiment of the present invention. In particular, in this embodiment, two pressure sensing devices 30 are provided: one at a front edge part of the closure member 2a and another one on a rear edge part of the closure member 2a. In another embodiment, such pressure sensing devices 30 may additionally or alternatively be provided on a side edge part of the closure member 2a or on the edge 5a of the frame 5, for example. Further, it is noted that the use of a pressure sensing device 30 is a mere embodiment of the present invention and the present invention may be embodied differently without the use of a pressure sensing device 30.

FIG. 2B shows a detailed view of an exemplary pressure sensing device 30. The pressure sensing device 30 comprises a compressable base layer 31 and a set of electrodes 32, wherein the set comprises at least two electrodes. The compressable base layer 31 may be formed from any kind of suitable base material like foam, a woven material or a non-woven material, wherein the material is substantially not electrically conductive. Conductive particles may be provided in the compressable base material such that upon compression of the base material the conductive particles may form conductive paths, thereby lowering the electric resistance of the compressable base layer 31. Also other embodiments are known from the prior art. Compression of the pressure sensing device 30 may be detected by measuring the electric resistance of the compressable base layer 31 through the set of electrodes 32. For example, using well known electronic circuitry, an induced voltage over terminals of the set of electrodes 32 may be used as a measure for the electric resistance of the pressure sensing device 30.

FIG. 2C shows the embodiment of FIG. 2A in more detail. As illustrated, the closure member 2a comprises a glass panel 21, which is, in its edge part, is covered with a PU encapsulation 22 as well known in the art. Application of pressure on the PU encapsulation is transmitted to the pressure sensing device 30.

The pressure sensing device 30 is arranged at a corner portion of the glass panel 21 such that the pressure sensing device 30 has a first part that is arranged on a main surface of the glass panel 21 and has a second part that is arranged on an edge surface of the glass panel 21, wherein the second part is substantially perpendicular to the first part. Thus, the pressure sensing device 30 is suitably arranged for detecting pressure from multiple directions, in particular from an interior side of the closure member 2a and at the front edge thereof.

As mentioned hereinabove, legal requirements may be applicable, wherein an object pinched between the edge 5a of the frame 5 and the closure member 2a should not be pinched with a force exceeding a predetermined maximum force, e.g. 100N. When closing the closure member 2a by moving in the direction of arrow A, an object may become trapped between the edge 5a and the PU encapsulation 22 of the closure member 2a. As a result, the pinched object will exert pressure on the PU encapsulation 22, which pressure is transmitted to the pressure sensing device 30. A pinch detection module operatively coupled to the pressure sensing device 30 is configured to detect the exerted pressure and to control the movement of the closure member 2a at least to halt before exceeding the predetermined maximum force and preferably reverses the closure member 2a in order to release any pinched object.

Figure 3A:
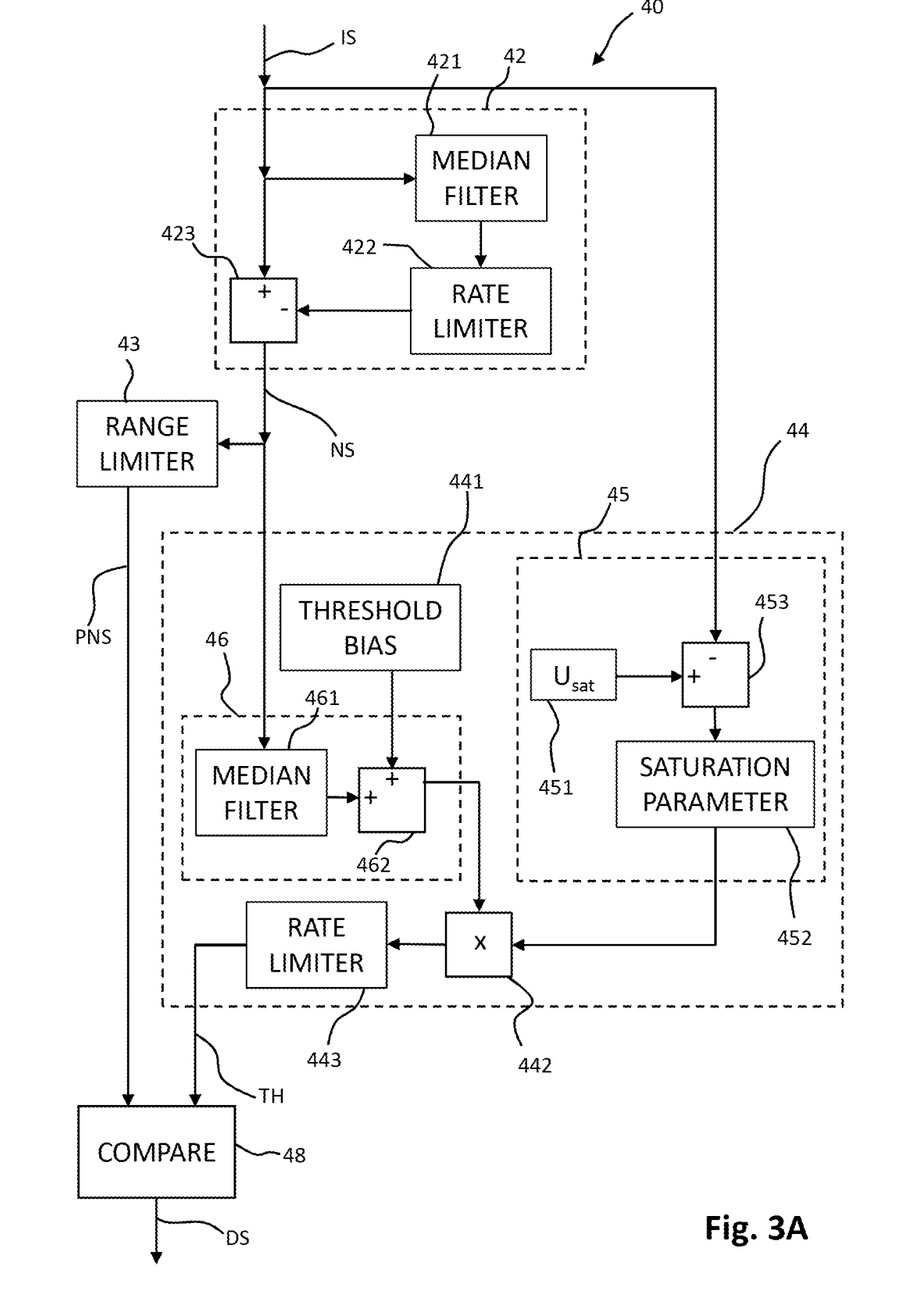
FIG. 3A shows a circuit diagram illustrating an embodiment of a pinch detection module.

FIG. 3A illustrates an embodiment of a pinch detection module 40, wherein the illustrated embodiment is configured for use with the pressure sensing device 30 as illustrated in FIGS. 2A-2C.

The pinch detection module 40 comprises an input normalization module 42, a range limiter 43 and a threshold determination module 44. The threshold determination module 44 comprises an input saturation compensation module 45 and an input compensation module 46.

In more detail, an input signal IS is received. In this embodiment, the input signal IS corresponds to a sensing signal provided by the pressure sensing device 30. For example, the sensing signal and thus the input signal IS is a voltage signal, wherein an amplitude of the input signal IS corresponds to an amount of pressure applied on the pressure sensing device 30. The input signal IS may comprise a signal offset, wherein a value of the signal offset may vary over time. This variation may relate to electrical properties of the pressure sensing device 30 and the coupled circuitry. Further, the signal offset may relate to mechanical properties of the pressure sensing device 30. For example, upon application of pressure and then relaxation of the pressure sensing device 30, the pressure sensing device 30 may require some time to relax to its original state due to which the sensing signal will only slowly revert to its original amplitude. Also other causes may be present for the varying amplitude of the signal offset of the input signal IS. In any case, the signal offset is not relevant for the detection of a pinched object. Therefore, the input signal IS is first normalized by the input normalization module 42 by removing the signal offset from the input signal IS to generate a normalized input signal NS. In particular, the illustrated embodiment of the input normalization module 42 comprises a median filter 421, a rate limiter 422 and a subtracting element 423.

The median filter 421 determines a median value from a number of samples of the input signal IS. The number of samples is selectable, wherein a small number results in an increased sensitivity to variations in the signal offset and a large number of samples results in an increased phase shift. A person skilled in the art is enabled to select a suitable number depending on the particular application. Further, for removing the signal offset, other mathematical operations may be suitably selected in accordance with the intended application within the scope of the present invention.

In a practical embodiment, wherein computational resources are limited, the number of samples may be selected at a reduced sampling rate compared to the sampling rate of the input signal IS. For example, if the input signal IS provides samples at a sampling rate of about 1 kHz and a suitable period for determining the median is selected to be about 1 second, the computational resources are required to provide a memory for at least 1000 samples. In this particular embodiment, the sampling rate may be reduced by e.g. a factor of 100 to about 10 Hz. Then, over a period of 1 second, only 10 samples need to be stored in the memory, significantly reducing the needed memory space. In view of the statistical properties of the median, it may be presumed that the median of the 10 samples instead of 1000 samples introduces only a minor and probably negligible inaccuracy. Apart from the reduced memory space, the processing capacity and time for determining the median of 10 samples are smaller than for determining the median of 1000 samples.

The rate limiter 422 receives the median value from the median filter 421 and assesses the median value in view of preceding median values. As above mentioned, the median value is expected to vary only slowly. In case of an unexpectedly fast change in median value, it may be presumed that the change may be due to a pinch, in which case the change should not be considered part of the signal offset. The rate limiter 422 therefore limits the change in the median value to a predetermined maximum. In case the change in median value exceeds the predetermined maximum, the rate limiter 422 adapts the median value e.g. to a value corresponding to the predetermined maximum change.

It is noted that the rate limiter may not be required. For example, in case only very fast changes are to be detected, due to the property of the median filter that samples over a period of 1 s are taken into account, any change well within this time frame of 1 s may not be directly reflected in the median value. Consequently, the steep rise of the input signal IS will remain in the normalized input signal NS.

The subtracting element 423 receives the input signal IS and the rate-limited median value as a representative value of the signal offset. The median value is subtracted from the input signal IS to remove the signal offset.

In an embodiment, the rate limiter 422 may have been configured to mainly limit positive changes, while allowing a negative change. As a pinch generates an increased signal amplitude and not a decreased signal amplitude, negative values representing a reduced amplitude cannot be used for detecting a pinch. In such an embodiment, more negative changes are absorbed in the signal offset and the normalized input signal NS will have less negative values. Still, as is described hereinbelow, steep negative changes need to be maintained in the normalized input signal for obtaining a suitable adaptive threshold.

The thus obtained normalized input signal NS is to be compared to a threshold. In accordance with the present invention, the threshold is dynamically determined based on the input signal IS by the threshold determining module 44. In the illustrated embodiment, the threshold is determined based on three components. First, a threshold bias 441 is provided as a base value for the threshold. This threshold bias 441 is compensated by an input compensation value to adapt the threshold to an offset level of the normalized input signal NS in the normalized input signal NS and by a saturation value for compensating for a saturation of the pressure sensing device 30.

The saturation compensation module 45 receives the input signal IS and a subtracting element 453 subtracts the input signal IS from a saturation voltage value $U_{sat}$ 451. The saturation voltage value $U_{sat}$ 451 corresponds to a signal amplitude above which a pinch is no longer detectable from the input signal IS, because the amplitude of the input signal IS cannot rise sufficiently anymore to a distinguishable level. For example, ultimately, the saturation voltage value $U_{sat}$ 451 corresponds to a maximum value of the voltage over the terminals of the pressure sensitive device, e.g. when fully compressed. In a practical embodiment, the saturation voltage value $U_{sat}$ 451 may be set lower to enable the amplitude of the input signal IS to increase significantly upon a pinch of an object. In an exemplary embodiment, the maximum voltage over the terminals of the pressure sensing device may be about 5 V, while the saturation voltage value $U_{sat}$ 451 may be set at about 3.3 V.

Figure 3B:
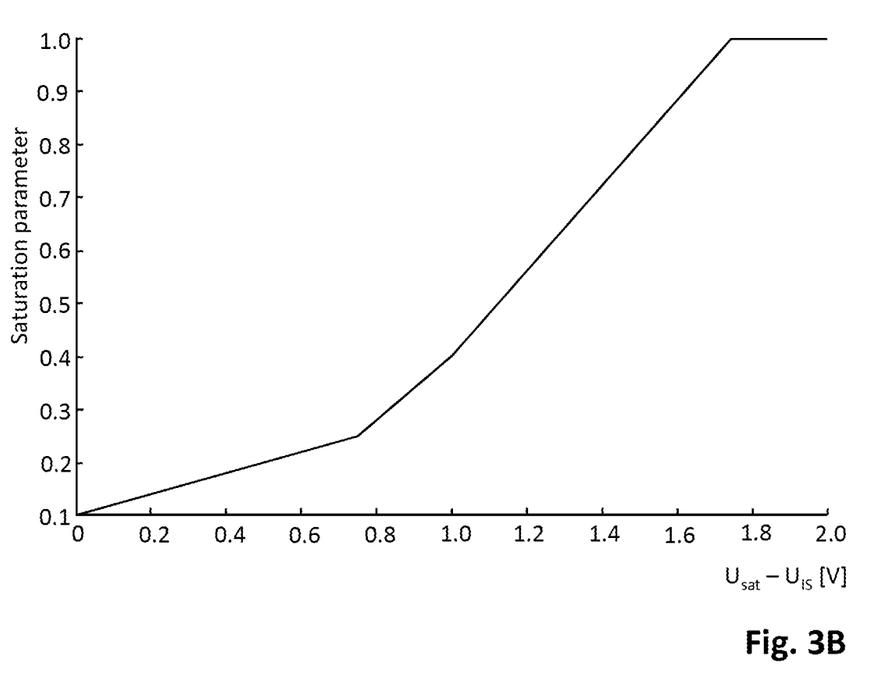
FIG. 3B shows an exemplary graph for determining a saturation parameter.

Based on the voltage difference between the amplitude of the input signal and the saturation voltage value $U_{sat}$ 451 a saturation parameter is determined. The saturation parameter 452 may be derived from a predetermined look-up table, a mathematical function, or any other suitable method. FIG. 3B shows a graph representing the saturation parameter 452 as a function of the voltage difference $U_{sat}-U_{IS}$. As long as the voltage difference is more than about 1.7 V, the saturation parameter 452 is equal to 1. When the voltage difference is smaller than about 1.7 V, the saturation parameter 452 becomes smaller than 1, thereby reducing the threshold through a multiplication by a multiplier 442. The reduced threshold ensures that with a smaller increase of the amplitude of the input signal IS e.g. due to saturation of the pressure sensing device, a pinch is still timely detected.

In the illustrated graph, the saturation parameter 452 is about 0.1, when the voltage difference is 0 V. With a voltage difference below 0 V, the amplitude of the input signal IS is higher than the saturation voltage value $U_{sat}$ 451. In such a case, the saturation parameter 452 may be selected to become 0 or even a negative value, e.g. −1, such that automatically a pinch is detected. In another embodiment, the saturation parameter 452 may be selected to become 0.1 such that a very low threshold results. Selection of the saturation parameter is considered to be within the ambit of the skilled person. In particular, dependent on the properties of the input signal, the saturation parameter 452 may exhibit different properties, e.g. decreasing instead of increasing with increasing voltage difference. Moreover, in an embodiment, the saturation parameter 452 may not be required and may thus be omitted.

Returning to FIG. 3A, the input compensation module 46 receives the normalized input signal NS. A second median filter 461 determines a normalized signal offset by determining a median value of the normalized input signal NS as a basis for compensating the threshold bias 441 for an offset level of the input signal IS. Of course, as described above in relation to the median filter 421 of the input normalization module 42, the number of samples for determining the median may be selected and, if so desired, a reduced sampling rate as compared to the sampling rate of the normalized input signal NS may be selected to reduce the required resources.

The normalized signal offset is then added to the threshold bias 441 by an adding element 462. The output of the adding element 462 is the output of the input compensation module 46, which is then multiplied with the saturation parameter 452 from the saturation compensation module 45.

As described in relation to the input normalization module 42, a large change of the threshold is not expected and thus the change of the threshold over time is limited by a rate limiter 443. As with the rate limiter 422 of the input normalization module 42, the rate limiter is optional and may not be required in a particular embodiment. The output of the rate limiter 443 corresponds to a dynamically adaptive threshold TH in accordance with the present invention.

As used herein, dynamically is intended to mean that the threshold is variable, while the input signal is received and processed. This adaptation may be continuously performed, but may as well be performed on a regular basis or in response to predetermined conditions occurring.

For comparison with the adaptive threshold TH, the normalized input signal NS is first input in the range limiter 43, which may remove any negative values or any excessive values, for example. Excessive values may occur upon start of the open roof assembly during which the pinch detection module initializes. Due to the phase shift caused by the input normalization module 42 and due to the lower sampling rate of the median filter 421, a number of samples at the start will have a significant larger value than after the initialization. The range limiter 43 may thus be optionally provided to adapt the normalized input signal NS for the comparator 48. In the present embodiment, the range limiter 43 at removes any negative values and is thus configured to output a positive normalized input signal PNS.

A comparison element 48 compares the positive normalized input signal PNS with the adaptive threshold TH and outputs a detection signal DS. If the positive normalized input signal PNS exceeds the threshold TH, the detection signal DS will indicate that a pinch has occurred. The detection signal DS may be supplied to a control unit such that the control unit may stop or reverse the movement of the closure member.

Figure 4A:
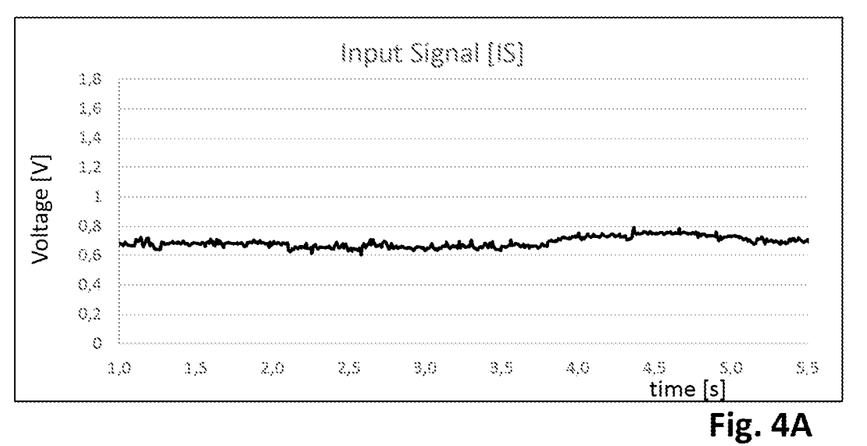
FIGS. 4A-4D show graphs of an exemplary input signal, normalized input signal, signal offset and threshold, respectively, according to a first experiment.

The embodiment of FIGS. 2A-2C and 3A—3B is further illustrated in FIGS. 4A-4D, representing results of a first experiment. In FIG. 4A, a sensing signal of a pressure sensing device 30 is shown as the input signal IS of the pinch detection module 40 of FIG. 3A. In this first experiment, the pressure sensing device 30 is arranged in an edge part of a closure member of an open roof assembly according to FIGS. 2A-2C except that the pressure sensing device 30 is not covered by PU encapsulation 22.

Figure 4B:
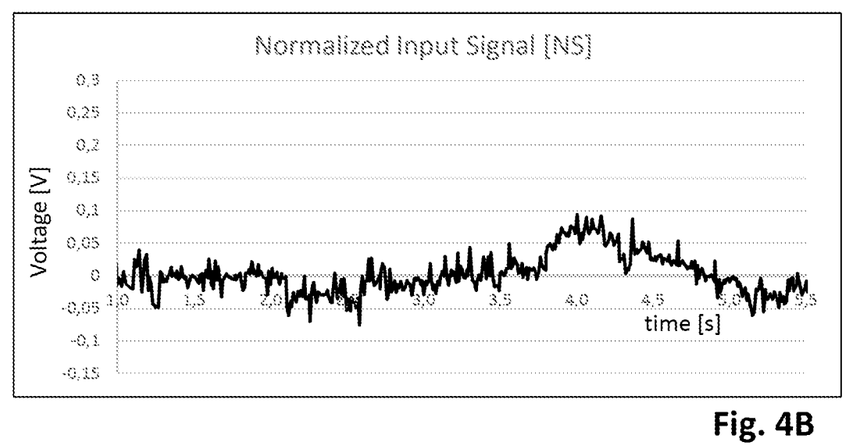

The horizontal axis represents time in seconds and the vertical axis represents a voltage as a measure for the electrical resistance of the pressure sensing device 30. The input signal IS fluctuates at a high frequency due to e.g. electrical noise and at a low frequency due to other properties as above explained. The signal offset is at time=0 s about 0.7 V and is at time=4.5 s about 0.75 V. Thus a minor variation in the signal offset is present. The signal offset is removed by the input normalization module 42 and provides the normalized input signal NS as shown in FIG. 4B. Subtracting the normalized input signal NS from the input signal IS provides the signal offset as shown in FIG. 4C.

Figure 4C:
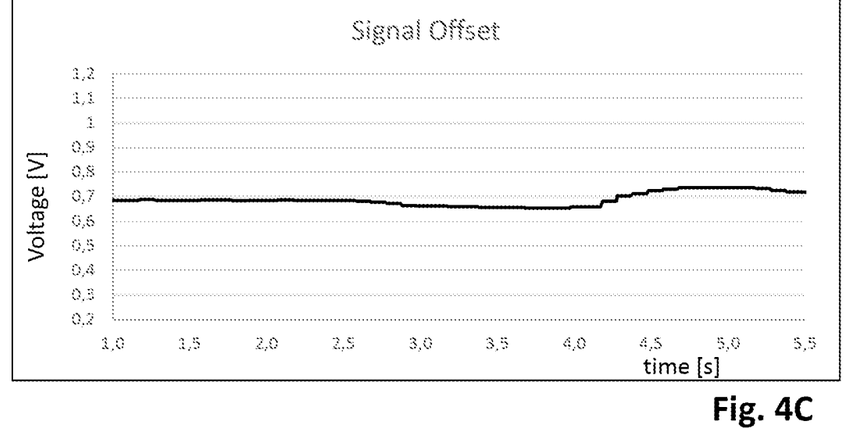

As apparent from FIGS. 4B and 4C, the signal offset and the low frequency fluctuation is removed from the input signal IS. Only a high frequency fluctuation of the input signal IS remains in the normalized input signal NS with a maximum amplitude of about 0.1 V.

Figure 4D:
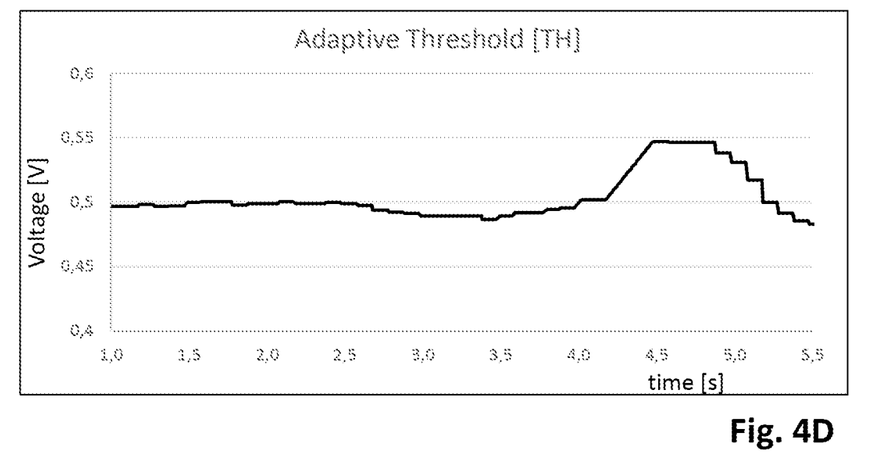

At the same time, the adaptive threshold TH, shown in FIG. 4D, fluctuates between about 0.48 V and about 0.55 V.

So, clearly, no pinch is detected as the (positive) normalized input signal (P)NS does not exceed the threshold TH at any time.

Assessment of the adaptive threshold TH in more detail shows that the adaptive threshold TH clearly responds to the rise of the normalized input signal NS at time=3.7-4.0 s. With the rise in the normalized input signal NS, while no pinch is detected, the adaptive threshold adapts to the increasing signal and rises as well. When the normalized input signal NS falls back, the adaptive threshold TH also falls back to its threshold bias value. Of course, due to the above-mentioned phase shift, the threshold rise and fall are delayed as compared to the rise and fall of the normalized input signal NS.

Figure 5:
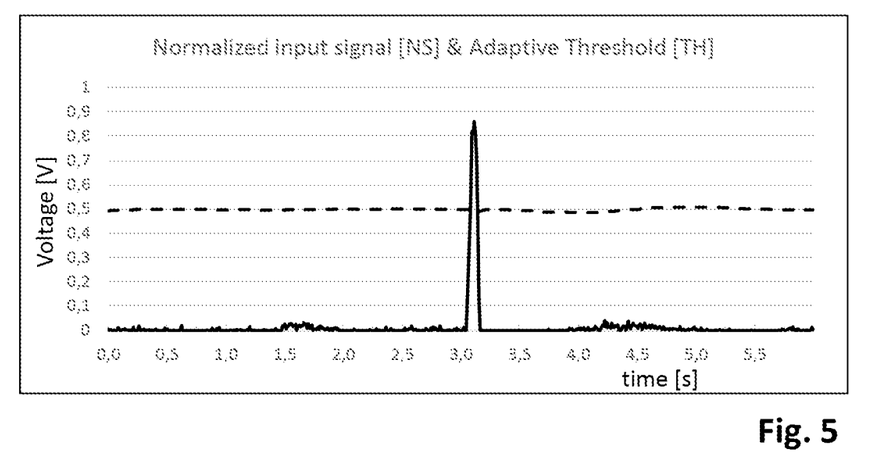
FIG. 5 shows graphs of an exemplary normalized input signal and threshold, respectively, according to a second experiment.

FIG. 5 shows results of a second experiment using the same setup as used for the first experiment. The horizontal axis represents time in seconds and the vertical axis represents a voltage. The solid curve represents the normalized input signal NS and the dashed curve represents the adaptive threshold TH.

In the second experiment, a pinch is induced. The object used is a force measurement device with a spring constant of 10 N/mm, which corresponds to a relatively soft object. It is apparent from FIG. 5 that the pinch occurred at time=about 3.0 s and the pinch was quickly detected and the closure member was reversed within about 0.23 seconds. The force measurement device indicated that the maximum force exerted on the force measurement device was 27 N, which is sufficiently below the legal requirement of a maximum of 100 N.

Figure 6:
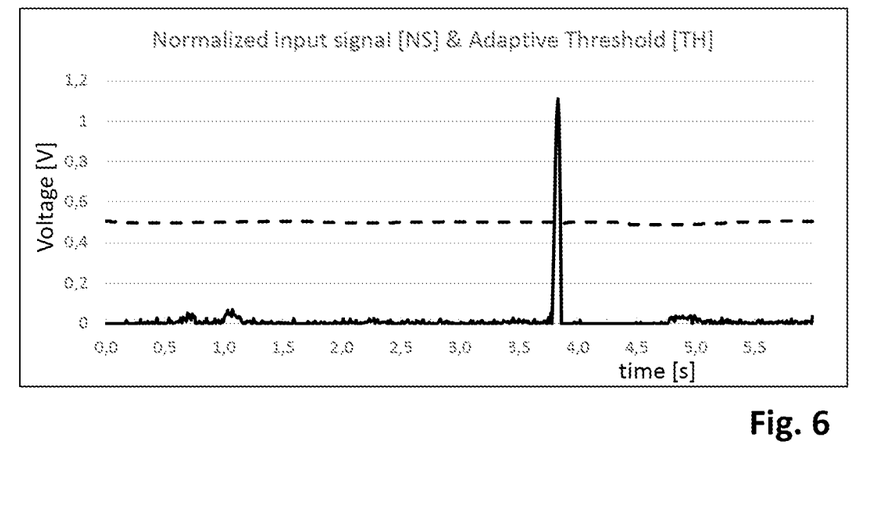
FIG. 6 shows graphs of an exemplary normalized input signal and threshold, respectively, according to a third experiment.

FIG. 6 shows results of a third experiment using the same setup as used for the first experiment. The horizontal axis represents time in seconds and the vertical axis represents a voltage. The solid curve represents the normalized input signal NS and the dashed curve represents the adaptive threshold TH.

In the third experiment, a pinch is induced. The object used is a force measurement device, wherein the object has a spring constant of 65 N/mm, which corresponds to a relatively hard object. It is apparent from FIG. 6 that the pinch occurred at time=about 3.7 s and the pinch was quickly detected and the closure member was reversed within about 0.20 seconds. The force measurement device indicated that the maximum force exerted on the force measurement device was 41 N, which is sufficiently below the legal requirement of a maximum of 100 N.

The second and third experiments show that the pinch detection module is able to detect a pinch with a soft object and a pinch with a hard object, both well within the legal requirements.

Figure 7A:
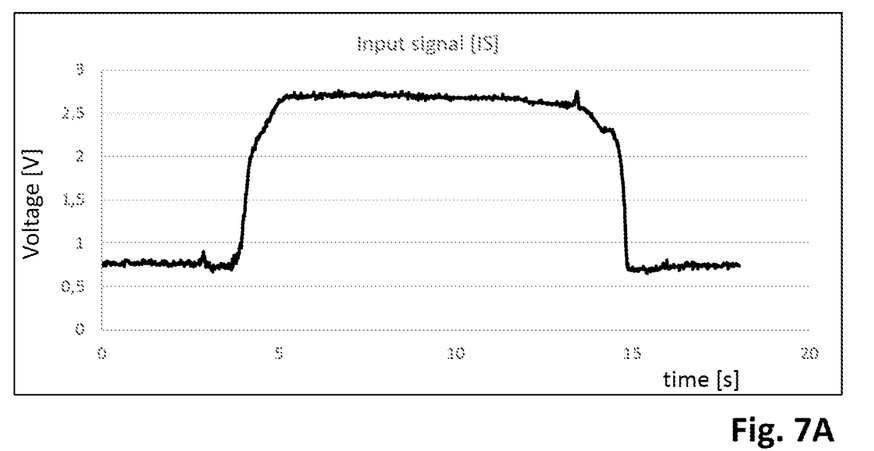
FIGS. 7A-7F show graphs of an exemplary input signal, normalized input signal and threshold, respectively, according to a fourth experiment.
Figure 7B:
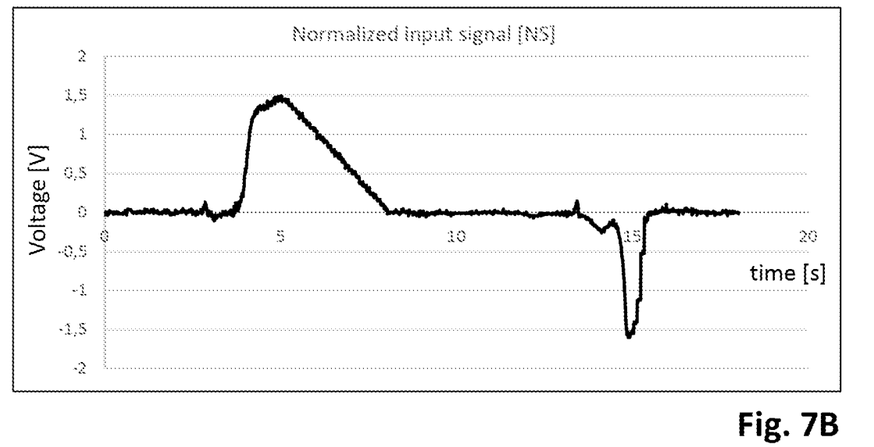
Figure 7C:
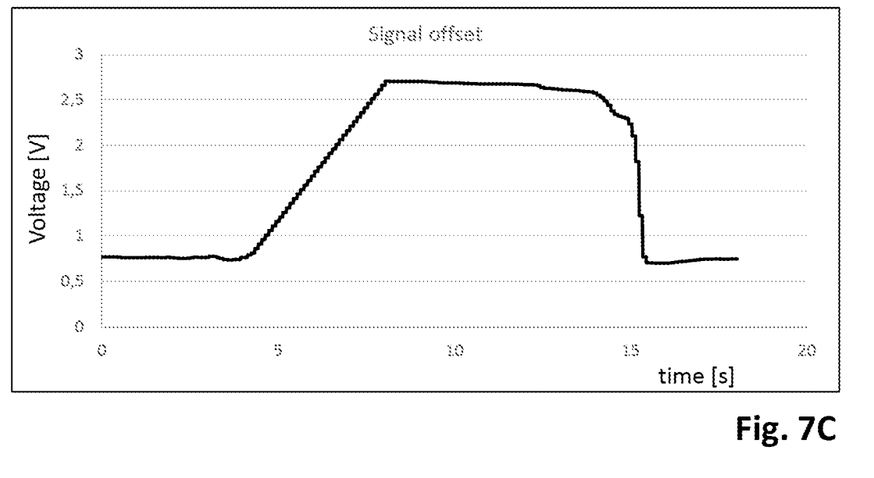
Figure 7D:
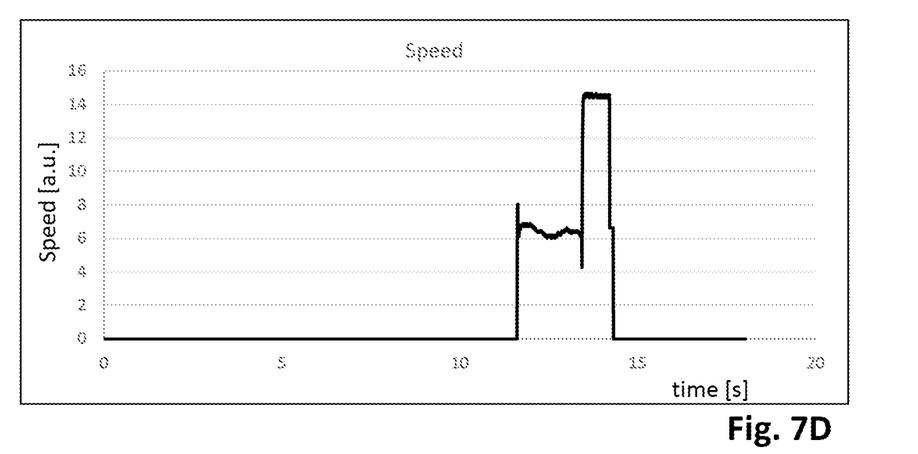

FIGS. 7A-7F illustrate a fourth experiment using the same setup as used for the second experiment. In FIGS. 7A-7C and 7E-7F, the horizontal axis represents time in seconds and the vertical axis represents a voltage. In FIG. 7D, The horizontal axis represents time in seconds and the vertical axis represents a speed of the closure member.

In the fourth experiment, prior to setting the closure member in motion at time t=about 11.5 s (FIG. 7D), a hand was placed on the pressure sensing device at time=about 4 s in order to partially saturate the pressure sensing device as apparent from FIG. 7A, due to which the input signal IS rapidly rises from about 0.75 V to about 2.75 V.

In FIG. 7B, the solid curve corresponds to the normalized input signal NS. The normalized input signal NS shows a rapid increase from time=about 4.0 s, which corresponds to the rapid increase in the input signal IS. Then, the pinch detection module slowly lets the normalized input signal return to a level of about 0 V, while the hand remains on the pressure sensing device. The rate of the return to 0 V results from the rate limiter of the input normalization module, limiting the rate of increase of the signal offset as illustrated in FIG. 7C.

With the hand remaining on the pressure sensing device, the closure member was then controlled to move in a closing direction at time=about 11.5 s until the pressure sensing device collided with the force measuring device at time=about 13.3 s. FIG. 7D shows the absolute value of the speed of the closure member. At about 11.5 s, the closure member starts to move with a speed of about 6.5 (arbitrary unit) in the closing direction. At about 13.3 s the absolute value of the speed changes to about 14.5 due to a pinch having been detected. The closure member has been reversed such to move the closure member in the opening direction. The speed in the opening direction is higher than the speed in the closing direction in this experiment due to the orientation of the open roof assembly. The open roof assembly was vertically oriented, wherein the closing direction was upward, i.e. gravity of the closure member had to be overcome, while in the opening direction gravity supported the movement.

Returning to FIG. 7A, at about 13.3 s, a minor spike is present in the input signal IS. This minor spike was due to the pinch. For safety reasons, the pinch detection module of an open roof assembly should be able to detect and respond to such a pinch, even if a person is holding his or her hand against the closure member before and during the movement of the closure member as in this experiment. It is noted that the same minor spike is visibly present in the graph of FIG. 7B at about 13.3 s.

Figure 7E:
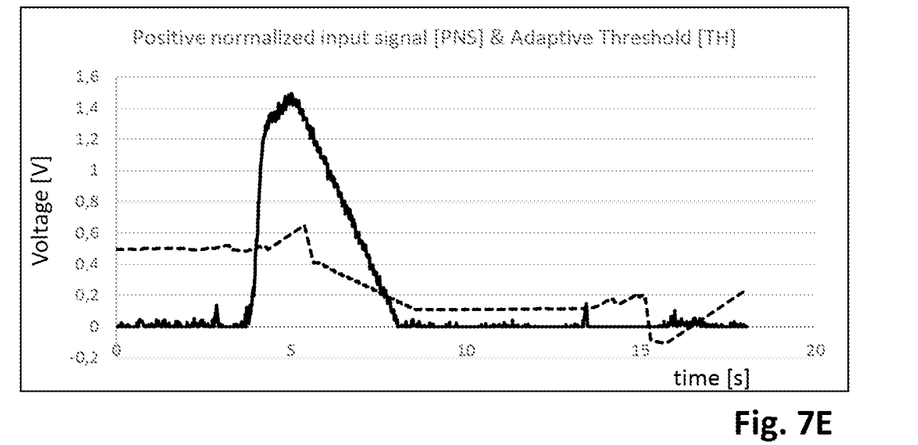
Figure 7F:
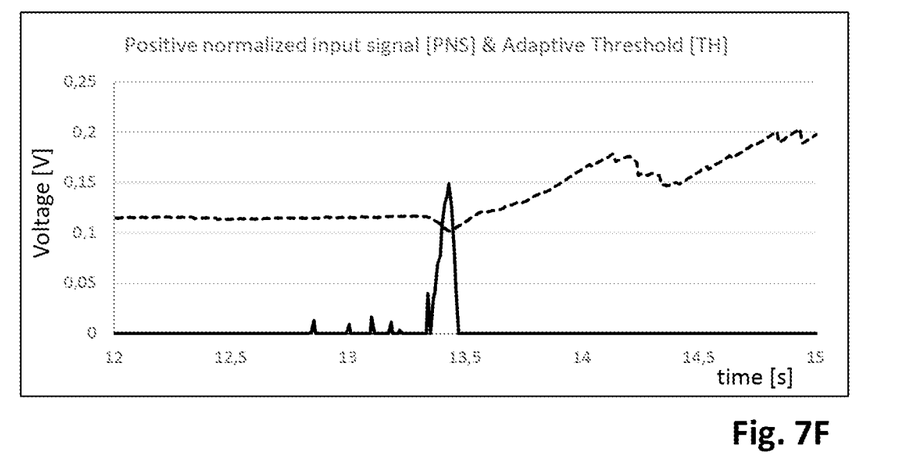

In FIG. 7E, the positive normalized input signal PNS is shown by the solid curve. The corresponding adaptive threshold TH is shown by the dashed curve. At about 4.0 s, the positive normalized input signal PNS rises corresponding to the normalized input signal (FIG. 7B). Slightly thereafter, the adaptive threshold TH starts to increase correspondingly. Similarly, shortly after the positive normalized input signal starts to fall, the adaptive threshold TH starts to fall.

In the period from about 4.0 s to about 7.8 s, the positive normalized input signal PNS exceeds the adaptive threshold TH and, consequently, the pinch detection module detects a pinch occurrence. However, due to the fact that the closure member is not moving, the pinch detection has no effect.

At about 13.3 s, i.e. at the occurrence of the pinch during closure member movement, FIG. 7E shows the minor spike in the positive normalized input signal PNS. This is shown in more detail in FIG. 7F. The spike due to the pinch has a value of about 0.15 V, which is significantly below the bias threshold value of 0.5 V. Consequently, without a threshold adaptation in accordance with the present invention, the pinch would not have been detected.

After the pinch detection at about 13.3 s, the closure member is reversed and the force exerted by the hand on the closure member first changes and the hand is removed at about 14.2 s. The steep fall of the input signal results in a negative adaptive threshold as shown in FIG. 7E at about 15.2 s. Soon thereafter the adaptive threshold TH starts to increase again.

Due to the adaptive threshold TH of the pinch detection module, the pinch was still detected in time to meet the legal requirement despite the pre-applied pressure by the hand. Moreover, the maximum pressure applied during the pinch was comparable to the maximum pressure exerted during a pinch without the pre-applied pressure.

The adaptive threshold may be applied in any method or system applying a threshold. The embodiment of the pinch detection module according to FIG. 3A is designed to address properties of the pressure sensing device as described herein. In any other application, the adaptive threshold may be adapted to any other set of properties of a related input signal. For example, the input signal may be received from a sensor or may be any other kind of signal such as a motor supply current or a signal derived from such a motor supply current. In a particular example of an open roof assembly, the motor supply current and speed may be used to determine a generated torque. This torque may be observed to prevent a pinch with a high force. Properties of the torque may then be used to design a particular compensation module to compensate for particular response additionally or alternatively the saturation compensation module as shown in FIG. 3A.

In another example, the input signal may be normalized by subtracting a reference signal, wherein the reference signal corresponds to a force along a trajectory of closing the closure member. For example, in known open roof assemblies, the moving closure member needs to push down a wind deflector device, requiring locally a higher force. In such an open roof assembly, the threshold may be lowered at such a position, while the input signal is compensated for the required higher force level by the reference signal. In accordance with the present invention, in such an exemplary embodiment, the threshold may be dynamically adapted to the absolute value similar to the saturation compensation module 45 and to the normalized input signal level similar to the input compensation module 46. As apparent to those skilled in the art any pinch detection module employing a threshold for pinch detection may be provided with a dynamically adaptive threshold in accordance with the present invention to improve sensitivity without increasing the possibility for false, incorrect detections.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. An open roof assembly for use in a vehicle roof of a vehicle, the open roof assembly comprising a movably arranged closure member for closing an opening in the vehicle roof and a pinch detection module for detecting a pinch of an object between the closure member and an edge of the opening during a movement of the closure member, wherein the pinch detection module is operatively coupled to receive an input signal during the movement of the closure member and is configured to detect the pinch based on said input signal and a threshold, wherein the pinch detection module is configured to dynamically determine the threshold based on the input signal, wherein the pinch detection module is configured to normalize the input signal prior to determining the threshold, thereby providing a normalized input signal, and wherein a median value of a selected part of the input signal is derived and the median value is subtracted from the input signal to provide the normalized input signal.

2. The open roof assembly according to claim 1, wherein the pinch detection module is configured to execute a plurality of cycles, each cycle comprising the steps of:
   a) receive the input signal;
   b) determine the threshold based on the input signal;
   c) detect the pinch by comparing the input signal to the threshold as determined in step b; and
   d) repeat steps a-c.

3. The open roof assembly according to claim 1, wherein a rate of change of the median value over time is limited by the pinch detection module.

4. The open roof assembly according to claim 1, wherein determining the threshold comprises deriving an input saturation value from the input signal and combining a threshold bias value and the input saturation value.

5. The open roof assembly according to claim 1, wherein a rate of change of the threshold over time is limited by the pinch detection module.

6. The open roof assembly according to claim 1, wherein the open roof assembly is provided with a pressure sensing device configured to output a sensing signal, wherein the pressure sensing device is arranged and configured to change the sensing signal when an object is pinched, and wherein the input signal as provided to the pinch detection module corresponds to the sensing signal.

7. The open roof assembly according to claim 1 wherein dynamically determining the threshold based on the input signal comprises determining the threshold while processing the input signal.

8. The open roof assembly according to claim 7 wherein dynamically determining the threshold based on the input signal comprises determining the threshold while continually processing the input signal.

9. The open roof assembly according to claim 1, wherein determining the threshold comprises determining an input compensation value based on the input signal and combining a threshold bias value and the input compensation value.

10. The open roof assembly according to claim 9, wherein determining the input compensation value comprises determining a median value of one of the input signal and a normalized input signal.

11. A method for operating an open roof assembly for use in a vehicle roof of a vehicle, the open roof assembly comprising a movably arranged closure member for closing an opening in the vehicle roof and a pinch detection module for detecting a pinch of an object between the closure member and an edge of the opening, wherein the pinch detection module receives during movement of the closure member an input signal, and dynamically determines a threshold based on said input signal and to detect the pinch based on said input signal and the threshold, wherein dynamically determining the threshold comprises computing an input compensation value based on the input signal and combining a threshold bias value and the input compensation value, wherein computing the input compensation value comprises computing a median value of one of the input signal and a normalized input signal,
- wherein the method further comprises normalizing the input signal prior to determining the threshold, thereby providing the normalized input signal, and
- wherein a median value of a selected part of the input signal is derived and the median value is subtracted from the input signal to provide the normalized input signal.

12. The method according to claim 11, the method comprising: executing a plurality of cycles, each cycle comprising the steps of:
- a) receiving the input signal;
- b) determining the threshold based on the input signal;
- c) detecting the pinch by comparing the input signal to the threshold as determined in step b; and
- d) repeating steps a-c.

13. The method according to claim 12, wherein determining the threshold based on the input signal comprises:
- normalizing the input signal to obtain the normalized input signal;
- limiting a rate of change of the normalized input signal over time;
- determining an input compensation value, based on the normalized input signal;
- providing a threshold bias value;
- determining an input saturation value based on the input signal; and
- combining the input compensation value, the input saturation value and the threshold bias value to obtain the threshold.

14. The method according to claim 11 wherein dynamically determining the threshold based on the input signal comprises determining the threshold while processing the input signal.

15. A computer software product comprising computer readable and executable instructions for instructing a computer processor to perform a method for operating an open roof assembly for use in a vehicle roof of a vehicle, the open roof assembly comprising a movably arranged closure member for closing an opening in the vehicle roof and a pinch detection module for detecting a pinch of an object between the closure member and an edge of the opening, wherein the pinch detection module is operatively coupled to receive during movement of the closure member an input signal and is configured to detect the pinch based on said input signal and a threshold, wherein the method comprises dynamically determining the threshold based on the input signal, wherein dynamically determining the threshold comprises computing an input compensation value based on the input signal and combining a threshold bias value and the input compensation value, wherein computing the input compensation value comprises computing a median value of one of the input signal and a normalized input signal, wherein the pinch detection module is configured to normalize the input signal prior to determining the threshold, thereby providing the normalized input signal, and wherein a median value of a selected part of the input signal is derived and the median value is subtracted from the input signal to provide the normalized input signal.

16. The computer software product according to claim 15, the method comprising:
- executing a plurality of cycles, each cycle comprising the steps of
  - a) receiving the input signal;
  - b) determining the threshold based on the input signal received in step a;
  - c) detecting the pinch by comparing the input signal to the threshold as determined in step b.

17. The computer software product according to claim 16, wherein determining the threshold based on the input signal comprises:
- normalizing the input signal to obtain the normalized input signal;
- limiting a rate of change of the normalized input signal over time;
- determining an input compensation value, based on the normalized input signal;
- providing a threshold bias value;
- determining an input saturation value based on the input signal; and
- combining the input compensation value, the input saturation value and the threshold bias value to obtain the threshold.

18. The computer software product according to claim 15 wherein dynamically determining the threshold based on the input signal comprises determining the threshold while processing the input signal.

* * * * *